Sept. 15, 1970
N. HOWERA
3,528,207
HOUSETRAILER CONSTRUCTION
Filed March 6, 1968
5 Sheets-Sheet 1
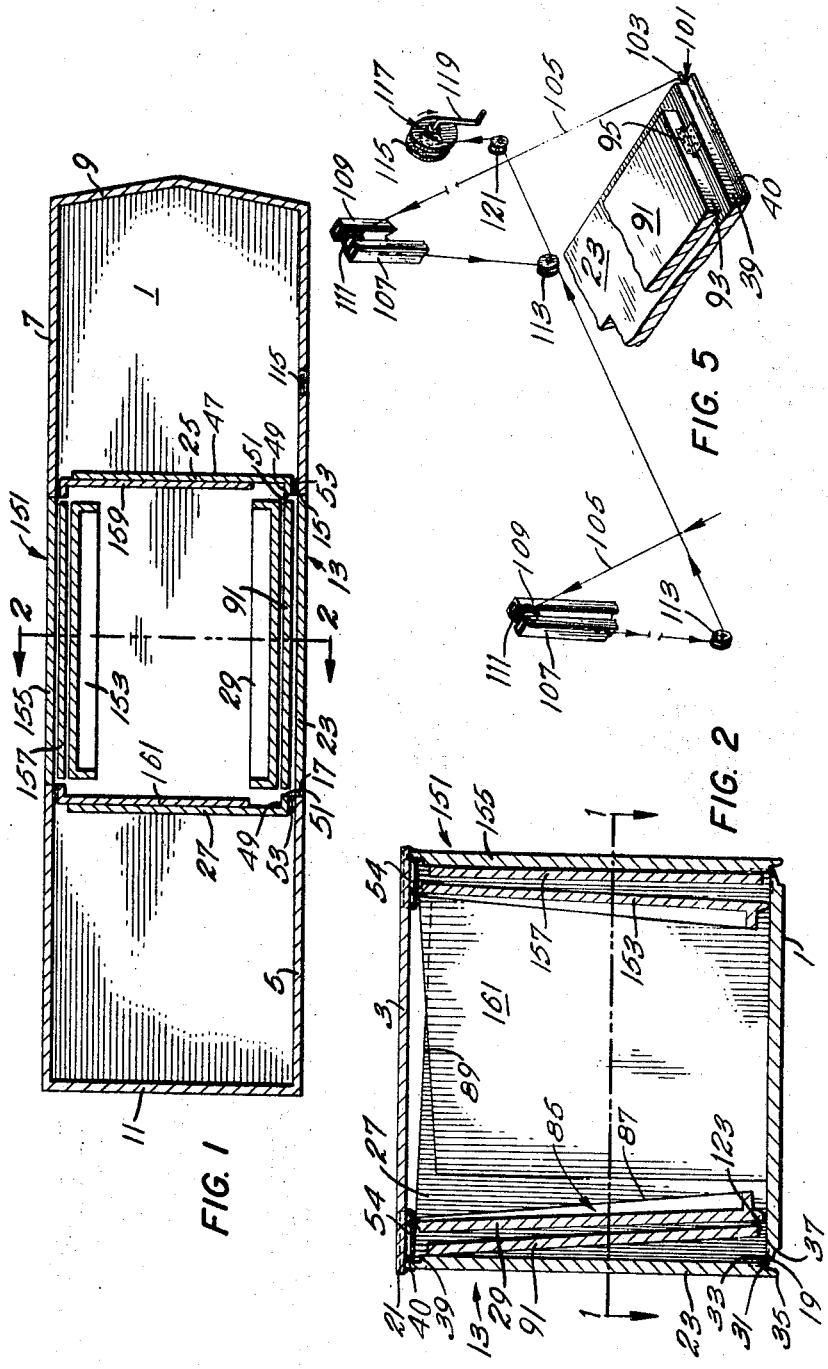
INVENTOR
Nickolas HOWERA
ATTORNEY Sept. 15, 1970   N. HOWERA   3,528,207
HOUSETRAILER CONSTRUCTION
Filed March 6, 1968   5 Sheets-Sheet 2

INVENTOR
Nickolas HOWERA

ATTORNEY

Sept. 15, 1970   N. HOWERA   3,528,207
HOUSETRAILER CONSTRUCTION
Filed March 6, 1968   5 Sheets-Sheet 5
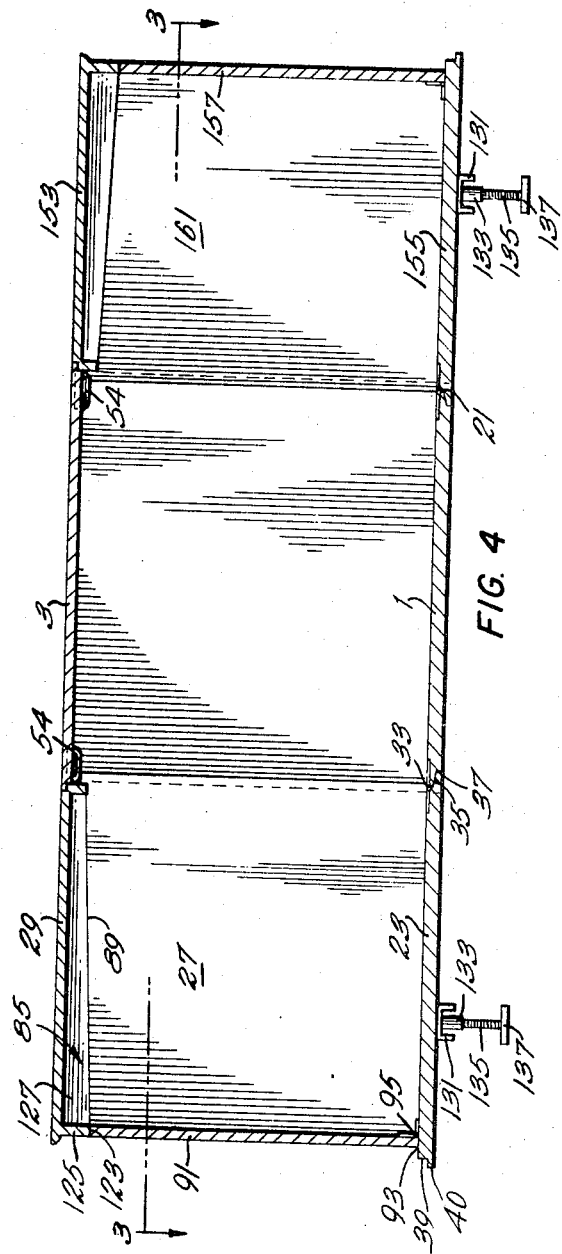
FIG. 4
INVENTOR
Nickolas HOWERA
ATTORNEY Sept. 15, 1970　　　　　　　　　　N. HOWERA　　　　　　　　　　3,528,207
HOUSETRAILER CONSTRUCTION
Filed March 6, 1968　　　　　　　　　　　　　　　　　　5 Sheets-Sheet 1
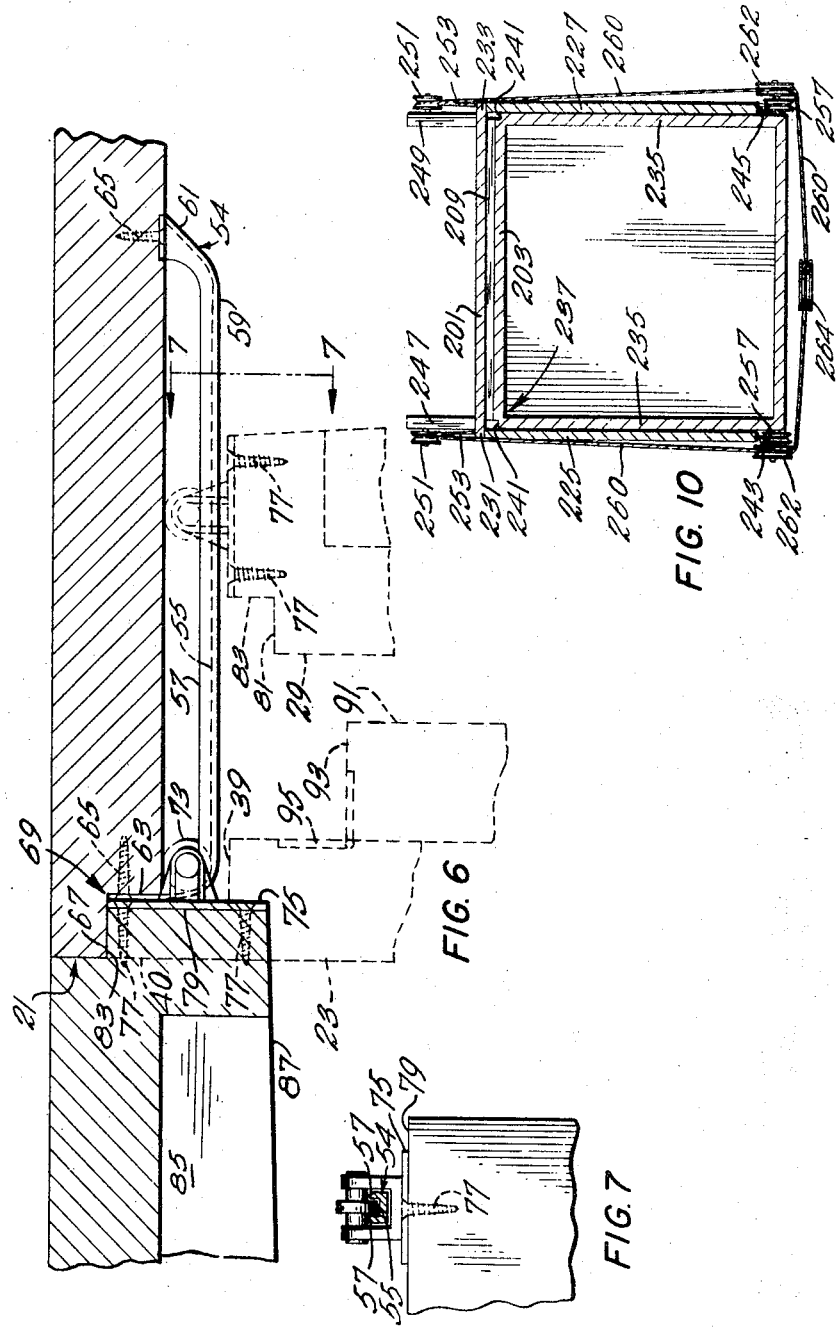
INVENTOR
Nickolas HOWERA
ATTORNEY Sept. 15, 1970     N. HOWERA     3,528,207
HOUSETRAILER CONSTRUCTION Filed March 6, 1968     5 Sheets-Sheet 5

INVENTOR
Nickolas HOWERA

ATTORNEY

United States Patent Office 3,528,207
Patented Sept. 15, 1970

3,528,207
HOUSETRAILER CONSTRUCTION
Nickolas Howera, 7245 Birnam St., Apt. 7,
Montreal 15, Quebec, Canada
Filed Mar. 6, 1968, Ser. No. 710,808
Claims priority, application Canada, Feb. 13, 1968,
012,401
Int. Cl. E04b 7/16
U.S. Cl. 52—67
11 Claims

ABSTRACT OF THE DISCLOSURE

A housetrailer constructed to provide additional living area when the trailer is parked.

In one embodiment, the trailer has hinged or pivoted panels which can be moved from within the trailer through an opening in the wall of the trailer to be connected together to provide an additional room extending from the trailer. In another embodiment, the trailer may have a set of connected panels overlying the roof and sides of the trailer which can be easily raised as a unit to form a second storey on the roof of the trailer.

---

This invention relates to a housetrailer construction and more particularly to a trailer construction having panels which can be moved to provide an additional room or rooms to the trailer.

Housetrailers are limited in size to the width which is allowed by highway regulations. The trailers are further limited to a size which can be easily pulled by ordinary cars. As a result, housetrailers are usually quite cramped for space and do not provide a large living area for people occupying the trailer.

It is, therefore, a principle object of the present invention to provide an improved housetrailer construction which can easily be increased in size when the trailer is parked from the normal size of the trailer as it travels on the highway in order to provide additional living area.

It is a further object of the invention to provide a housetrailer construction whereby the additional living area added to the trailer when it is parked may be in the form of rooms added to the main body of the trailer at the same floor level and/or by erecting a second storey to the trailer.

It is a further object of the invention to provide an improved trailer construction whereby the additional living area may be added to the housetrailer simply and quickly by moving hinged or pivoted panels stored within the trailer during travel to a position where they extend outwardly of the main body of the trailer forming an additional room.

It is a further object of the invention to provide a simple means for erecting a second storey living area on a parked trailer from a set of interconnected panels which overlie a portion of the trailer during highway travel.

With these and other objects in view, the invention consists of certain novel features of construction as will be more fully described and particularly pointed out in the appended claims.

The invention will now be described in detail having reference to the accompanying drawings in which:

FIG. 1 illustrates a cross-sectional plan view of the housetrailer taken on line 1—1 in FIG. 2 showing the arrangement of panels for additional rooms when positioned within the trailer;

FIG. 2 is a cross-sectional end view taken on line 2—2 of FIG. 1;

FIG. 4 is a cross-section taken on line 4—4 of FIG. 3;

Figure 3:
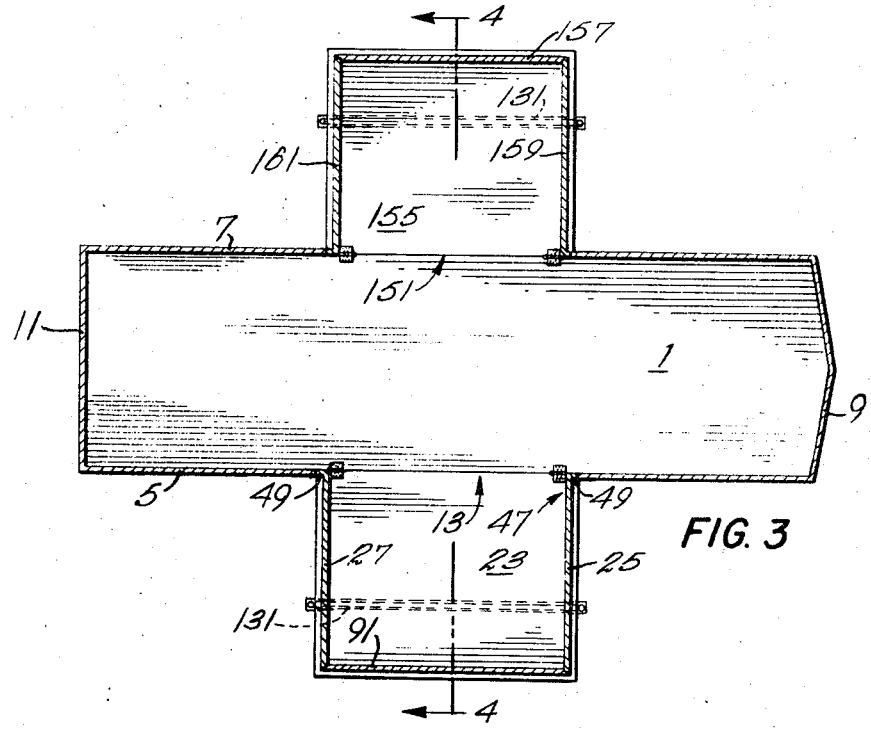
FIG. 3 is a cross-sectional plan view of the trailer taken on line 3—3 of FIG. 4 showing the panels positioned outside the trailer to form rooms.
Figure 9:
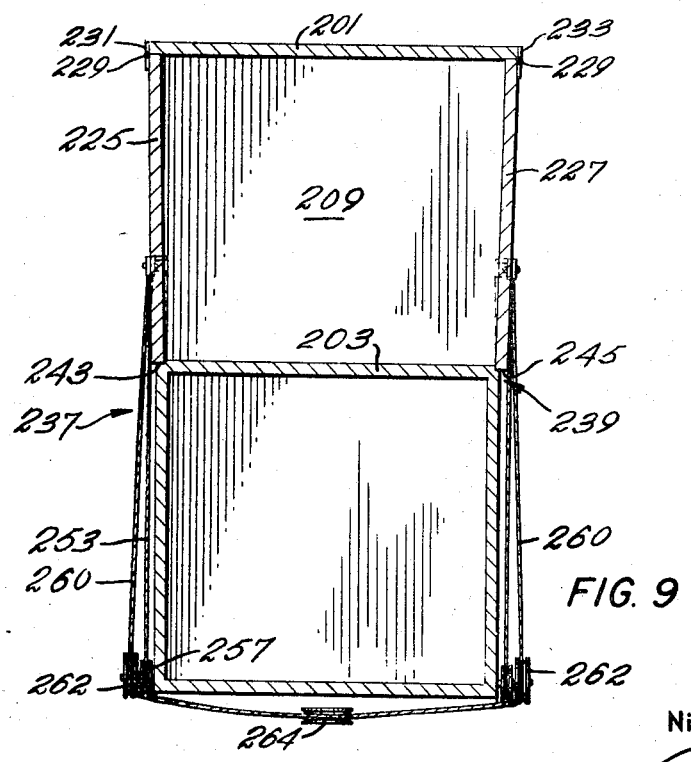
Figure 8:
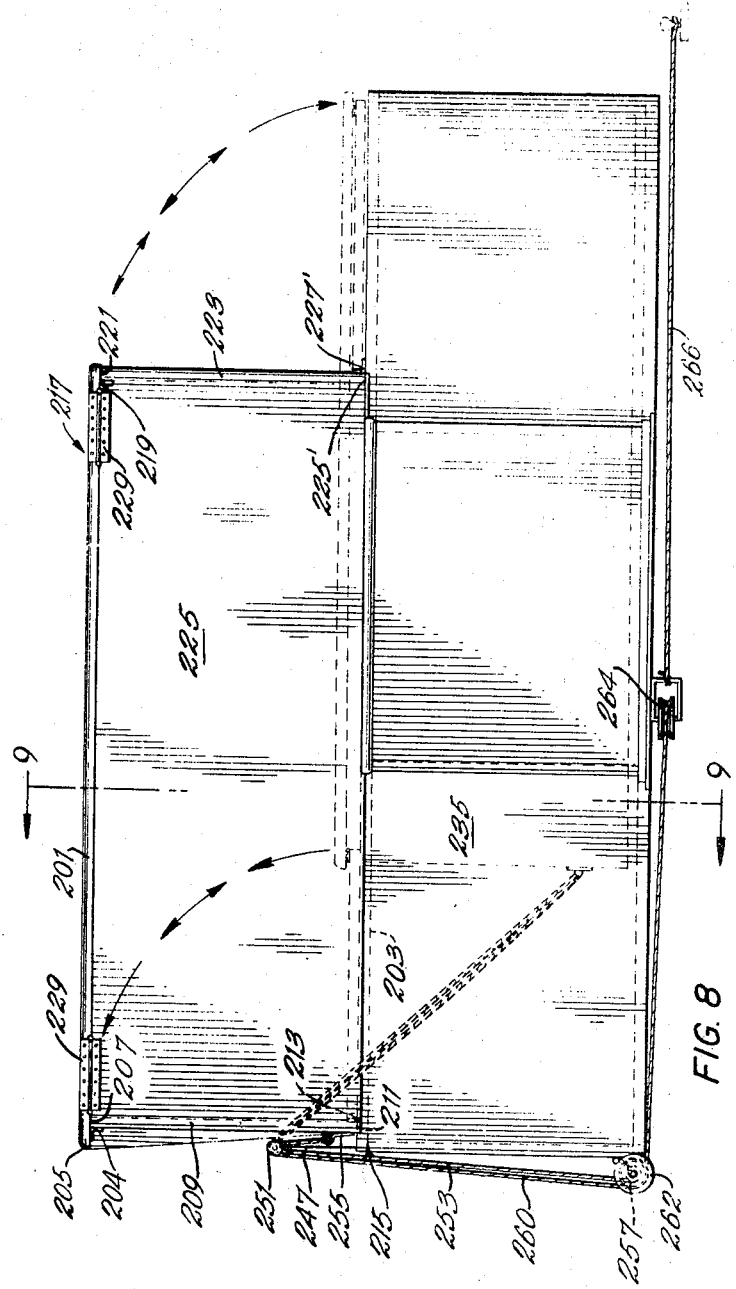

FIG. 5, appearing on the same sheet as FIG. 1, illustrates the lifting mechanism for the floor panel;

FIG. 6 is a detail in partial cross-section showing the mounting of the roof panel for the additional room;

FIG. 7 is a cross-section taken on line 7—7 of FIG. 6;

FIG. 8 is a longitudinal elevation showing a trailer with a second storey;

FIG. 9, appearing on the same sheet as FIG. 3, is a cross-section taken on line 9—9 of FIG. 8; and FIG. 10, appearing on the same sheet as FIG. 6, is a cross-section taken on line 9—9 of FIG. 8 but with the second storey in collapsed position.

Having reference to the accompanying drawings in which like reference characters are used to designate like parts, FIGS. 1 and 2 illustrate the basic rectangular construction of a housetrailer in accordance with one feature of the invention having a floor 1, a roof 3, side walls 5 and 7 and end walls 9 and 11 forming a room-like enclosure. At least one of the side or end walls has a rectangular opening 13 therein. As shown in FIG. 1, the opening 13 is in the side wall 5 although it could be in any of the side or end walls. The opening 13 is defined by vertical edges 15 and 17 of the side wall 5 and horizontal edges 19 and 21 of the floor 1 and roof 3 respectively. The opening need not extend to the roof of the trailer and the upper horizontal edge could be defined by a portion of the side wall 5 instead. Movably mounted adjacent the edges 15, 17, 19 and 21 of the opening are four rectangular-shaped panels 23, 25, 27 and 29. As shown in FIG. 2, the panel 23, which will form the floor of an additional room, is attached along its lower edge 31 by hinges 33 to the edge 19 of the trailer floor defining the opening 13. The floor-forming panel 23 can have a tongue 35 at its lower edge 31 which mates with a shoulder 37 on the edge of the trailer floor 1 when the panel is moved to a second horizontal position. The opposite or top edge 39 of the floor panel has a flange 40 which, when the panel is in a first vertical position, cooperates with the upper edge 21 of the roof defining the opening in a manner to be described allowing the floor panel 23 to close the opening 13. The panel can be moved from the first vertical position to the second horizontal position where it is in the same plane as the plane of the floor of the trailer by means of a lifting mechanism to be described later. Suitable means can be provided adjacent the side and top edges of the panel 23 to seal the opening 13 to the weather when the panel is in a vertical position closing the opening.

Pivotably mounted on each vertical edge 15 and 17 of the opening 13 are the two side wall panels 25 and 27. One side 47 of each side wall panel has a short flange 49 extending at right angles from the side wall panel. The end surfaces 51 of each flange face each other when the panels are located within the trailer. Alternatively, the flanges could be formed by bending the side wall panels adjacent the side 47 through 90°. Both panels are mounted on the edges 15 and 17 of the opening by hinges 53 attached to the flanges 49 and the trailer wall 5 as shown in FIG. 1. The panels can be moved from a first position from within the trailer, where they extend transversely to the side walls of the trailer, through 180°, through the opening 13 to a second position where they extend outside the trailer and transversely to the side walls. When in the second position, the surfaces 51 of the flanges 49 face or abut against edges 15 and 17 of the side wall defining the opening 13. The flanges 49 on the panels permit use of an opening 13 which is wider than the width of the assembled room. This allows the roof panel 29 which is approximately as wide as the room to be easily moved through the opening in a manner to be described without interference with the edges 15 and 17 of the opening and without interfering with the side panels 25 and 27 when they are located within the trailer.

Mounted on the bottom of the roof of the trailer and adjacent each side wall of the trailer defining the opening 13 are two guide rails 54. The rails 54 are identical in construction so only one will be described in detail having reference to FIGS. 6 and 7. Each rail has a central track 55 with side flanges 57. The rail is of channel-shaped cross section. Each rail 54 is approximately one foot in length and extends into the trailer transversely from the edge 21 defining the opening 13. The rail has a straight track portion 59 and upturned ends 61 and 63. The rail is attached to the roof of the trailer at its ends by screws 65. The edge 21 of the roof of the trailer is formed with a flange 67 defining a shoulder 69. The rail 54 extends to the shoulder 69 with its upturned end 63 attached to the face of the shoulder. The floor panel 23, when closing opening 13, has its edge 39 spaced below the rails 54 with flange 40 cooperating with shoulder 69 to seal the opening without interference with the rails.

The roof panel 29 is suspended from the rails by rollers 73 which are attached by bracket 75 and screws 77 to edge 79 of the panel. Each roller rides on track 55 of the rails 54. The ends 61 and 63 of the rails act as stops and keep the rollers on the tracks. The panel 29 is movable from a first position adjacent the ends 61 of rails 54 from within the trailer to a position adjacent ends 63 through rollers 73. The panel can then be pivoted about roller 73 to a second horizontal position. The panel 29 has a shoulder 81 and flange 83, which, when the panel is moved to the second raised horizontal position, cooperate with the shoulder 69 and flange 67 of the edge of the roof of the trailer in abutting relation. The rails need only be long enough to provide space between the roof panel 29 and the floor panel 23 for a front panel 91, to be described, when the roof panel is in its first position within the trailer and the floor panel closes the opening.

The roof panel 29 can be formed with short partial side wall sections 85 the edges 87 of which abut with the upper edges 89 of the side panels and front panel 91 when the room is erected. This arrangement allows the side panels 25 and 27 to be of a lesser height than is required to form the finished height of the room so that these panels may swing through 180° outwardly through the opening without interfering with the guide rails 54 supporting the ceiling panel. Both the edges 87 of wall sections 85 and edges 89 may be formed to abut with lap joints.

The fifth rectangular panel 91 forming the outer wall of the additional room is, as shown in FIG. 4, pivotably attached at an edge 93 by hinges 95 adjacent the edge 39 of the floor panel 23. The fifth panel is movable from a first position parallel and adjacent to the floor panel to a second raised position transverse to the floor panel. Instead of being attached to the floor panel 23, the outer panel could be attached to the roof panel and pivot down from the roof panel to extend transversely therefrom to the floor panel when both floor and roof panels are in their horizontal position.

To aid in erecting the additional room, lifting and lowering means can be used as shown in FIG. 5. Mounted on the outer upper corners 101 of the floor panel 23 are brackets 103. Adjacent the vertical edges 15, 17 defining the opening in the side wall are spaced-apart vertical channel members 107 and 109 defining between them a vertical passageway. A pulley 111 is mounted at the top of the passage between the members 107, 109 and a second pulley 113 is mounted, at 90° to the first pulley 111, and between the members 107, 109 at the bottom of the passage adjacent the floor of the trailer. A reel 115 and ratchet mechanism 117 is mounted within the side wall 5 of the trailer adjacent the opening 13. Beneath the reel 115 there can be provided a further guide pulley 121 located within the wall of the trailer and in the same horizontal plane as the two guide pulleys 113. Cables 105 are attached to the brackets 103 on the floor panel and pass over the upper pulleys 111, down the passageway between the members 107, 109, around the lower pulley 113, under or through a horizontal passageway in the floor 1 of the trailer to the guide pulley 121 and up to the reel 115 on which the cables can be wound. When the floor panel is in a first vertical position, the cables are wound up on the reel 115 to maintain the floor in its vertical position and thus close the opening 13 and the reel is locked to prevent unwinding by the ratchet mechanism 117. When erecting the additional room for the trailer, the reel is unlocked, and rotated by a removable handle 119 to unwind the cables off the reel and lower the floor panel 23. The reel can be locked again when the floor panel is horizontal to help maintain the floor panel in its horizontal position. The roof panel 29 is then pulled outwardly from within the trailer along the guide rails 54 and pivotably raised about the rollers 73 to a horizontal position. Since the outer wall panel 91 lying horizontally on the floor panel is shorter than the length of the floor panel as shown in FIG. 2, and since, if necessary, the roof panel can be pivoted about its rollers 73 as it is moved outwards, the roof panel can clear the edge 123 of the outer panel without difficulty. After the roof panel has been raised, the outer wall panel 91 is raised to a vertical position about its hinges attaching it to the floor panel. The front section 125 of partial wall 85 of the roof panel is arranged to rest on the edge 123 of the erected outer panel 91 as shown in FIG. 4. The opening 13 in the side wall of the trailer is now clear for the side wall panels to be pivoted 180° about their hinges from within the trailer to be vertically aligned with the lower edges of the side sections 127 of the partial wall 85 extending downwardly from the roof panel 29. All the panels in their unfolded position now form a room extending from the side wall of the trailer.

If desired, additional support for the floor panel of the additional room can be provided as shown in FIG. 4 when the floor is in its horizontal position. A channel 131 is attached to the bottom face of the floor panel extending across its width and located closer its edge 39 than edge 31. Two sockets 133 are attached at either end of the channel. When the floor panel is horizontal, lifting jacks 135 can be inserted in the sockets. The jacks have a base plate 137 attached to the threaded portion 139 of the jack. The base plate 137 rests on the ground and the jack can be adjusted in height to level and support the floor panel.

As shown in FIGS. 1 to 4, the trailer can be provided with panels to form a second additional room extending from the side of the trailer opposite the side from which the first additional room extends. The panels forming the second additional room are constructed, mounted and moved in the same manner as the panels of the first additional room. However, the second opening 151 in the wall of the trailer is narrower than the first opening 13 and the roof panel 153, floor panel 155, and outer panel 157 are of a size to fit the narrower opening. The second additional room is therefore narrower than the first room. The smaller opening allows the side wall panels 159, 161 of the second room to nest or lie within, adjacent and parallel to, the side wall panels 25 and 27 of the first room portion without interfering with them as shown in FIG. 1. The side wall panels 159, 161 will also be shorter than panels 25, 27 so as not to interfere with the roof panel 29 when it is folded within the trailer.

All the edges of the panels which abut or overlap each other when the rooms are erected can be provided with gasket material to provide a tight weatherproof seal between the panels.

As shown in FIGS. 8, 9 and 10, additional living area can be provided for the trailer using a set of panels arranged on the roof and sides of the trailer which, when moved from a first position to a second position, form a second storey on the trailer. The set of panels for the second storey include a rectangular roof panel 201 of approximately the same width as the roof 203 of the trailer and long enough to cover a major portion of the roof. The roof panel 201 is connected at one edge 205 by hinges 204 to an edge 207 of a first rectangular wall panel 209. The opposite edge 211 of the first wall panel 209 is connected with hinges 213 to the roof 203 of the trailer adjacent its back edge 215. The opposite edge 217 of the roof panel 201 is connected with hinges 219 to an edge 221 of a second rectangular wall panel 223. The opposite edge 225' of the second wall panel 223 is connected to the roof 203 by hinges 227'. As shown in dotted lines in FIG. 8, when in a first, folded position, the roof panel 201 rests on both the first and second wall panels 209 and 223, completely covering second panel 223 and only overlapping the edge 207 of first panel 209.

Two third and fourth rectangular wall panels 225, 227 are connected with hinges 229, one to each side edge 231, 233 of the roof panel 201. When the roof panel 201 is in a folded, first position, the side panels extend down the sides 235 of the trailer. The edges 237, 239 of the roof 203 of the trailer can be formed with a shoulder 241 which receives the lower edges 243, 245 of the side panels when the roof panel 201 has been raised to a second position.

To raise the roof and wall panels from a first to a second position erecting the second storey, lifting means are attached to the roof 203 of the trailer at its back edge 215. The lifting means can comprise two vertical support posts 247, 249 located at each corner. Since the posts and lifting mechanism associated with each are similar in construction, only one will be described in detail. Post 247 has a pulley 251 connected at its top. A cable 253, attached to a bracket 255 at the lower rear corner of wall panel 225, passes over the pulley 251 and is wound on a reel and ratchet mechanism 257 attached to the lower back side of the trailer. Two people, each operating a reel at each side of the trailer can erect the panels to form the second storey. When the cable is wound on the reels, the wall panels 225, 227 slide upwardly and rearwardly along the sides of the trailer. Upward movement of these wall panels causes the roof panel 201 to be raised pivoting about hinge connections 213, 227'. Simultaneously, the wall panels 209, 223 are also raised. The wall panels 225, 227 are raised until their lower edges 243, 245 can rest on the shoulders 241 on the roof of the trailer. To aid in positioning the edges on the shoulders, these wall panels can be pivotably connected to the roof to swing inwardly toward the shoulders once the panels have cleared the sides of the trailer. The reel 257 can be locked with the cables 253 acting as safety cables to help maintain the second storey in an erected position. To ensure a good seal between all four wall panels when the wall panels 225, 227 move inwardly, the panels 209, 223 can be slightly tapered, wider at the top than at the bottom, at an angle equal to the angle through which the wall panels 225, 227 move. In an erected position the wall panels 225, 227 overlie the side edges of wall panels 209, 223. Suitable gasket or sealing means can be attached to the edges of panels 209, 223 to provide weathertight seals between the joints. Suitable means can also be provided to lock the wall panels 225, 227 to the roof or side wall of the trailer when the panels rest on the shoulders of the roof.

When the second storey is erected, the reels 257 can be locked in place.

To lower the second storey, the wall panels 225, 227 are moved off the shoulders 241 and the reels 257 are unwound to lower all the panels to their collapsed position overlying the roof and sides of the trailer.

The posts 247 can be detachably connected to the corners of the roof of the trailer. They must have the strength to withstand the turning moments applied to them. Using the posts to locate the pulleys 251 above the roof of the trailer reduces the turning moments and makes it easier to lift the panels.

An alternate arrangement can be provided for raising the panels forming the second storey. As shown in FIGS. 8, 9 and 10, a second set of cables 260 can be attached, one to each bracket 255 on the wall panels 225 and 227. Each cable passes over corresponding pulley 251 and down and around a pulley 262 attached to each reel 257. The cables pass under the trailer body and are attached to a movable pulley 264 centrally located under the trailer. A cable 266 extending from the pulley past the front end of the trailer can be attached to an automobile trailer hitch. Driving the automobile forward slowly, with cable 266 attached to it, will cause the second storey to be raised to its erected position. When in the raised position, the reel and ratchet mechanisms are again locked with cables 253, wound on them, acting as safety cables.

Using both the panel construction for adding two additional rooms and the panel construction for adding a second storey, the living area of the trailer can be more than doubled. Certain of the walls forming the second storey and the additional rooms can be provided with windows and/or doors. A door in a panel of the second storey can open up onto the roof panel of one of the additional rooms. Extending from the side of the trailer, the roof provides a balcony. A trap door and swinging ladder, not shown, provide access to the second storey of the trailer from within the trailer. The panels for both the additional rooms and second storey can be constructed in the same well-known ways as the walls forming the body of the trailer are constructed.

While a preferred construction has ben shown, it will be obvious that various modifications can be made in the manner in which the panels are connected and joined together in their erected position without departing from the invention described.

I claim:

1. A housetrailer construction comprising a floor, a roof and side walls forming an enclosure, means including a pair of opposed vertical edges and an upper and lower horizontal edge defining a rectangular opening through one of said walls, a pair of side wall panels, each of said side wall panels having a flange along one edge, the flange extending perpendicularly to the plane of said side wall panels, means hingedly connecting the side wall panels by their flanges to respective opposed vertical edges of the opening for pivotal movement of said side wall panels substantially 180° from an erected position substantially perpendicular to said one wall and projecting outwardly therefrom to a collapsed position substantially perpendicular to said one wall and projecting inwardly therefrom, a roof panel, means pivotably and slidably connecting said roof panel to said trailer adjacent said upper horizontal edge for movement of said roof panel to and from a collapsed position substantially parallel to said one wall and an erected position substantially perpendicular to and projecting outwardly from said one wall, a floor panel, means connecting said floor panel along one edge to said trailer adjacent said lower horizontal edge for movement from an erected position substantially perpendicular to said one wall and projecting outwardly therefrom and a collapsed position substantially flush with said one wall to close said opening, said floor panel terminating in a free edge at its edge remote from said edge connected to said lower horizontal edge.

2. A trailer as defined in claim 1, wherein said side wall panels when in said collapsed position are clear of said opening.

3. A trailer as defined in claim 2, further comprising means defining a second opening through a side wall opposed to said one side wall and a second side, roof, floor and end panels arranged and connected to said trailer in substantially the same manner as said side, wall, roof, floor and end wall panels on said first opening.

4. A trailer as defined in claim 3, wherein said means movably connecting said roof panel to said trailer further includes means for moving said roof panel bodily perpendicular to said one wall when said roof panel is in its collapsed position.

5. A housetrailer as defined in claim 4, further comprising an end wall, panel means pivotably connecting said end wall panel to said floor panel adjacent said free edge for movement from an erected position substantially perpendicular to said floor panel to a collapsed position substantially parallel to said floor panel.

6. A trailer as defined in claim 5, further comprising a pair of spaced top end walls, means pivotably connecting said top end walls at one end thereof to said roof for movement from a collapsed position adjacent to said roof to an erected position substantially perpendicular to said roof, a second roof, means pivotably connecting said second roof to the ends of said top end walls remote from said one end and top side walls connected to said second roof and depending therefrom.

7. A trailer as defined in claim 6, further comprising means on said top side walls cooperating with said roof panels to lock said top end walls and said second roof in erected position.

8. A trailer as defined in claim 7, wherein both of said top end walls are spaced from one end of said roof, with the closer of said top end walls to said end of said roof being spaced from said end of said roof at its pivotable connection by a distance substantially equal to the height of said top end wall.

9. A trailer as defined in claim 1, further comprising a pair of spaced top end walls, means pivotably connecting said top end walls at one end thereof to said roof for movement from a collapsed position adjacent to said roof to an erected position substantially perpendicular to said roof, a second roof, means pivotably connecting said second roof to the ends of said top end walls remote from said one end and top side walls connected to said second roof and depending therefrom.

10. A trailer as defined in claim 9, further comprising means on said top side walls cooperating with said roof panels to lock said top end walls and said second roof in erected position.

11. A trailer as defined in claim 10, wherein both of said top end walls are spaced from one end of said roof, with one of said top end walls being spaced from said end of said roof at its pivotable connection by a distance substantially equal to the height of said top end wall.

References Cited

UNITED STATES PATENTS

| 2,188,545 | 1/1940 | Smelker | 296—26 |
| 2,640,721 | 6/1953 | Kors | 52—69 X |
| 2,860,384 | 11/1958 | Wait et al. | 52—69 |
| 2,886,856 | 5/1959 | Suk Kun Che | 52—69 |
| 2,913,775 | 11/1959 | Saicor | 52—69 |
| 3,050,331 | 8/1962 | Mansen | 52—66 X |
| 3,177,530 | 4/1965 | De Pew | 52—234 X |
| 3,195,190 | 7/1965 | Malo | 52—69 |
| 3,408,102 | 10/1968 | McNamee | 52—69 X |

FRANK L. ABBOTT, Primary Examiner

S. D. BURKE, Assistant Examiner

U.S. Cl. X.R.

52—70, 234; 296—26